United States Patent
Horn et al.

(10) Patent No.: US 8,509,162 B2
(45) Date of Patent: Aug. 13, 2013

(54) SYSTEM AND METHOD FOR SCHEDULING OVER MULTIPLE HOPS

(75) Inventors: Gavin B. Horn, La Jolla, CA (US);
Avneesh Agrawal, San Diego, CA (US);
Ashwin Sampath, Skillman, NJ (US);
Alexei Y. Gorokhov, San Diego, CA (US); Naga Bhushan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 690 days.

(21) Appl. No.: 12/365,777

(22) Filed: Feb. 4, 2009

(65) Prior Publication Data

US 2009/0201846 A1 Aug. 13, 2009

Related U.S. Application Data

(60) Provisional application No. 61/028,489, filed on Feb. 13, 2008.

(51) Int. Cl.
*H04W 4/00* (2009.01)
*H04J 3/08* (2006.01)

(52) U.S. Cl.
USPC .......................................... 370/329; 370/315

(58) Field of Classification Search
USPC .............. 370/395.4, 279, 293, 315, 328, 338, 370/310.2, 492, 501
See application file for complete search history.

(56) References Cited

U.S. PATENT DOCUMENTS

| | | | | |
|---|---|---|---|---|
| 6,965,568 B1 * | 11/2005 | Larsen | ........................... | 370/238 |
| 7,139,251 B1 * | 11/2006 | Varma | ........................... | 370/280 |
| 7,386,036 B2 * | 6/2008 | Pasanen et al. | ................ | 375/211 |
| 7,400,856 B2 * | 7/2008 | Sartori et al. | ...................... | 455/7 |
| 7,826,487 B1 * | 11/2010 | Mukerji et al. | ................ | 370/477 |

(Continued)

FOREIGN PATENT DOCUMENTS

| CN | 101030883 A | 9/2007 |
|---|---|---|
| EP | 1830490 A1 | 9/2007 |

(Continued)

OTHER PUBLICATIONS

International Search Report and Written Opinion—PCT/US2009/033978, International Search Authority—European Patent Office—Jun. 4, 2009.

(Continued)

*Primary Examiner* — Warner Wong
(74) *Attorney, Agent, or Firm* — François A. Pelaez

(57) ABSTRACT

Systems and methodologies are described that facilitate scheduling over multiple hops in a wireless communication network. Radio resources can be partitioned into sets of sub-frames that can be allocated statically and/or dynamically. Statically allocated radio resources can be reassigned over time based on the loading on each hop and/or throughput imbalance. In addition, dynamic assignment of sub-frames to each hop can be based on traffic or channel conditions. Moreover, the radio resources can be dynamically allocated in a distributed scheme, wherein a base station controls the scheduling of resources, or a centralized scheme, wherein a relay station controls the scheduling of resources. Furthermore the allocation of radio resources can be transparent or explicit. In the transparent case, the access terminal listens directly to the base station, and the relay station does not transmit control information, such as DL or UL assignments. Conversely, when the allocation of resources is explicit the relay station does transmit control information.

40 Claims, 16 Drawing Sheets

(56) References Cited

U.S. PATENT DOCUMENTS

| | | | |
|---|---|---|---|
| 7,974,240 B2* | 7/2011 | Liu et al. | 370/329 |
| 7,991,352 B2* | 8/2011 | Suh et al. | 455/8 |
| 8,457,044 B2* | 6/2013 | Song | 370/328 |
| 2002/0177447 A1 | 11/2002 | Walton et al. | |
| 2003/0087673 A1 | 5/2003 | Walton et al. | |
| 2006/0046643 A1* | 3/2006 | Izumikawa et al. | 455/7 |
| 2006/0062191 A1* | 3/2006 | Matsumoto | 370/338 |
| 2006/0133272 A1* | 6/2006 | Yuan et al. | 370/230 |
| 2006/0209671 A1* | 9/2006 | Khan et al. | 370/208 |
| 2007/0081502 A1* | 4/2007 | Lee et al. | 370/337 |
| 2007/0081507 A1 | 4/2007 | Koo et al. | |
| 2007/0104223 A1* | 5/2007 | Lee et al. | 370/470 |
| 2007/0115821 A1* | 5/2007 | Sim et al. | 370/231 |
| 2007/0190933 A1* | 8/2007 | Zheng et al. | 455/7 |
| 2007/0217367 A1* | 9/2007 | Lee et al. | 370/335 |
| 2008/0013520 A1 | 1/2008 | Liu et al. | |
| 2008/0075178 A1* | 3/2008 | Lappetelainen et al. | 375/260 |
| 2009/0003267 A1* | 1/2009 | Ramachandran et al. | 370/328 |
| 2009/0097433 A1* | 4/2009 | Shen et al. | 370/315 |
| 2009/0103561 A1* | 4/2009 | Qi et al. | 370/468 |
| 2009/0135777 A1* | 5/2009 | Sundaresan | 370/329 |
| 2010/0020697 A1* | 1/2010 | Lewis et al. | 370/241 |
| 2011/0110310 A1* | 5/2011 | Cai | 370/328 |

FOREIGN PATENT DOCUMENTS

| | | |
|---|---|---|
| EP | 1995980 A1 | 11/2008 |
| KR | 20070038875 A | 4/2007 |
| RU | 2288538 | 11/2006 |
| RU | 2294599 | 2/2007 |
| WO | WO02093782 A1 | 11/2002 |
| WO | WO02093819 A1 | 11/2002 |
| WO | 2005067173 A1 | 7/2005 |
| WO | WO2007098704 | 9/2007 |

OTHER PUBLICATIONS

Liu Y., et al., "Integrated Radio Resource Allocation for Multihop Cellular Networks With Fixed Relay Stations," IEEE Journal on Selected Areas in Communications, vol. 24, No. 11, Nov. 2006.

* cited by examiner

SYSTEM AND METHOD FOR SCHEDULING OVER MULTIPLE HOPS

CLAIM OF PRIORITY UNDER 35 U.S.C. §119

The present Application for Patent claims priority to Provisional Application No. 61/028,489 entitled "SYSTEM AND METHOD FOR SCHEDULING OVER MULTIPLE HOPS" filed Feb. 13, 2008, and assigned to the assignee hereof and hereby expressly incorporated by reference herein.

BACKGROUND

1. Field

The present disclosure relates generally to wireless communications, and more specifically but not exclusively to various techniques for scheduling over multiple hops in wireless communication networks.

2. Background

Wireless communication systems are widely deployed to provide various types of communication content such as, for example, voice, data, and so on. Typical wireless communication systems may be multiple-access systems capable of supporting communication with multiple users by sharing available system resources (e.g., bandwidth, transmit power, . . . ). Examples of such multiple-access systems may include code division multiple access (CDMA) systems, time division multiple access (TDMA) systems, frequency division multiple access (FDMA) systems, orthogonal frequency division multiple access (OFDMA) systems, and the like. Additionally, the systems can conform to specifications such as third generation partnership project (3GPP), 3GPP long term evolution (LTE), ultra mobile broadband (UMB), and/or multi-carrier wireless specifications such as evolution data optimized (EV-DO), one or more revisions thereof, etc.

Generally, wireless multiple-access communication systems may simultaneously support communication for multiple mobile devices. Each mobile device may communicate with one or more base stations via transmissions on forward and reverse links. The forward link (or downlink) refers to the communication link from base stations to mobile devices, and the reverse link (or uplink) refers to the communication link from mobile devices to base stations. Further, communications between mobile devices and base stations may be established via single-input single-output (SISO) systems, multiple-input single-output (MISO) systems, multiple-input multiple-output (MIMO) systems, and so forth. In addition, mobile devices can communicate with other mobile devices (and/or base stations with other base stations) in peer-to-peer wireless network configurations.

Currently, ad-hoc wireless networks are being deployed to provide long range wireless communications for voice, data, audio, video, messaging, and multimedia (e.g., content). An ad-hoc wireless network is formed by a number of wireless nodes that join together to provide backhaul services to other wireless nodes. In an ad-hoc wireless network, content is routed from one wireless node to another until the content reaches its destination. A continuous connection is provided to the destination through one or more intermediate nodes, which may be dynamically reconfigured to maintain a connection when one or more wireless nodes in the ad-hoc network becomes unavailable.

Ad-hoc wireless networks provide a unique opportunity to expand the wireless coverage currently offered by existing infrastructures. By way of example, an ad-hoc wireless network may be used to expand the geographic reach of a cellular network or a WLAN. An ad-hoc wireless network also provides an attractive alternative to cable and Digital Subscriber Lines (DSLs) for broadband access. With the recent advent of ad-hoc wireless networks and the vast potential for improving wireless communications, more efficient ways are needed to support the transmission of content through these networks.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with one or more aspects and corresponding disclosure thereof, various aspects are described in connection with facilitating scheduling over multiple hops in a wireless communication network. According to related aspects, a method for scheduling over multiple hops in wireless networks is provided. The method includes providing a set of radio resources for use by one or more nodes. The method further includes assigning the radio resources for use in downlink and uplink communications in a paired manner.

Another aspect relates to a wireless communications apparatus. The wireless communications apparatus can include at least one processor configured to schedule over multiple hops in wireless communication networks. The at least one processor includes a first module for providing a set of radio resources for use by one or more nodes. The at least one processor further includes a second module for assigning the radio resources for use in downlink and uplink communications in a paired manner, wherein assigning resources in a paired manner further includes assigning a corresponding uplink control sub-frame for each set of downlink sub-frames assigned to a hop, and assigning a corresponding downlink control sub-frame for each set of reverse link sub-frames assigned to a hop.

Yet another aspect relates to an apparatus that includes means for providing a set of radio resources for use by one or more nodes. The apparatus can additionally include means for assigning the radio resources for use in downlink and uplink communications in a paired manner, wherein assigning resources in a paired manner further includes assigning a corresponding uplink control sub-frame for each set of downlink sub-frames assigned to a hop, and assigning a corresponding downlink control sub-frame for each set of reverse link sub-frames assigned to a hop.

Still another aspect relates to a computer program product, which can have a computer-readable medium including a first set of codes for causing a computer to provide a set of radio resources for use by one or more nodes. The computer readable medium can also comprise a second set of codes for assigning the radio resources for use in downlink and uplink communications in a paired manner, wherein assigning resources in a paired manner further includes assigning a corresponding uplink control sub-frame for each set of downlink sub-frames assigned to a hop, and assigning a corresponding downlink control sub-frame for each set of reverse link sub-frames assigned to a hop.

Moreover, an additional aspect relates to an apparatus. The apparatus can include a radio component that provides a set of radio resources for use by one or more nodes. The apparatus can further include a scheduling component that assigns the radio resources for use in downlink and uplink communications in a paired manner, wherein assigning resources in a paired manner includes assigning a corresponding uplink control sub-frame for each set of downlink sub-frames assigned to a hop, and assigning a corresponding downlink control sub-frame for each set of reverse link sub-frames assigned to a hop.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
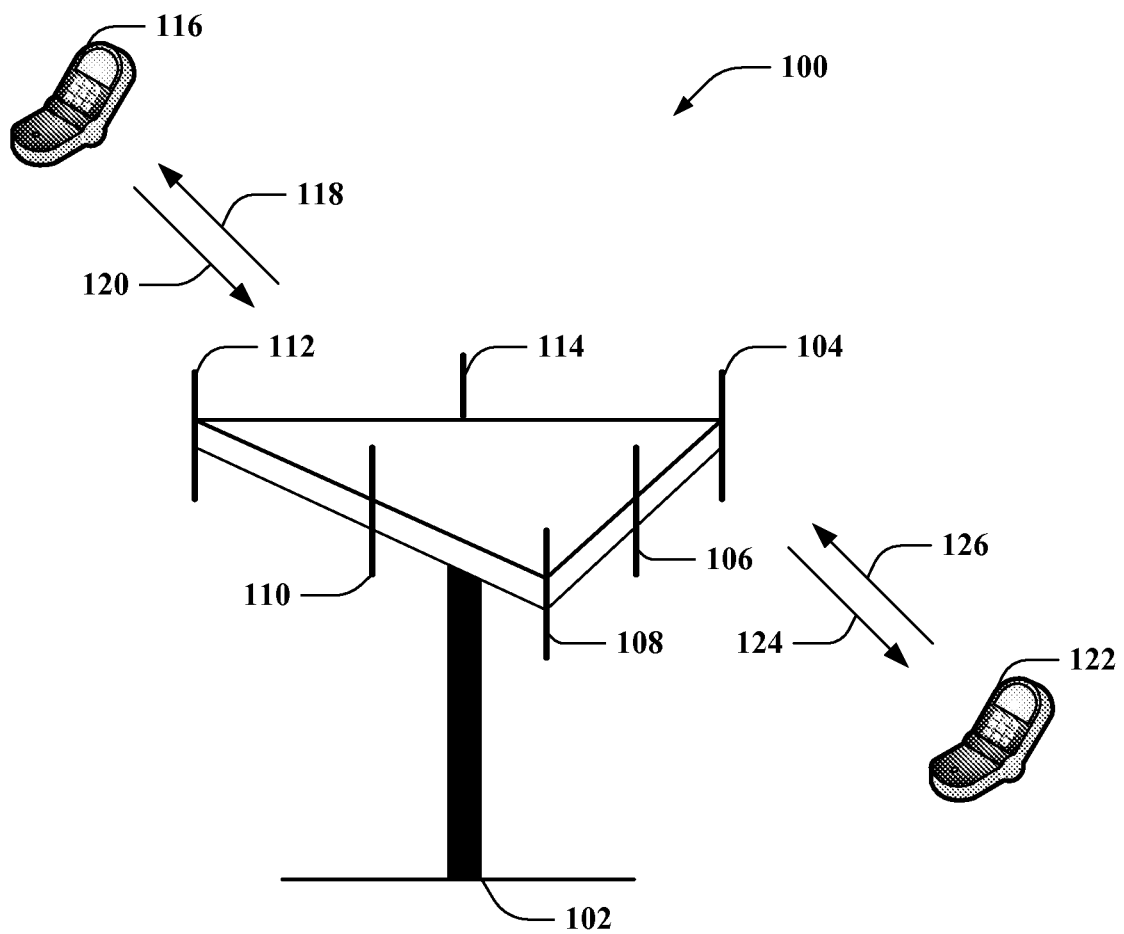
FIG. 1 illustrates an example multiple access wireless communication system in accordance with an aspect of the subject specification.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal. A terminal can also be called a system, device, subscriber unit, subscriber station, mobile station, mobile, mobile device, remote station, remote terminal, access terminal, user terminal, terminal, communication device, user agent, user device, or user equipment (UE). A wireless terminal may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Moreover, various aspects are described herein in connection with a base station. A base station may be utilized for communicating with wireless terminal(s) and may also be referred to as an access point, a Node B, or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM□, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, cdma2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

Referring now to FIG. 1, a wireless communication system 100 is illustrated in accordance with various embodiments presented herein. System 100 comprises a base station 102 that can include multiple antenna groups. For example, one antenna group can include antennas 104 and 106, another group can comprise antennas 108 and 110, and an additional group can include antennas 112 and 114. Two antennas are illustrated for each antenna group; however, more or fewer antennas can be utilized for each group. Base station 102 can additionally include a transmitter chain and a receiver chain, each of which can in turn comprise a plurality of components associated with signal transmission and reception (e.g., processors, modulators, multiplexers, demodulators, demultiplexers, antennas, etc.), as will be appreciated by one skilled in the art.

Base station 102 can communicate with one or more mobile devices such as mobile device 116 and mobile device 122; however, it is to be appreciated that base station 102 can communicate with substantially any number of mobile devices similar to mobile devices 116 and 122. Mobile devices 116 and 122 can be, for example, cellular phones, smart phones, laptops, handheld communication devices, handheld computing devices, satellite radios, global positioning systems, PDAs, and/or any other suitable device for communicating over wireless communication system 100. As depicted, mobile device 116 is in communication with antennas 112 and 114, where antennas 112 and 114 transmit information to mobile device 116 over a forward link 118 and receive information from mobile device 116 over a reverse link 120. Moreover, mobile device 122 is in communication with antennas 104 and 106, where antennas 104 and 106 transmit information to mobile device 122 over a forward link 124 and receive information from mobile device 122 over a reverse link 126. In a frequency division duplex (FDD) system, forward link 118 can utilize a different frequency band than that used by reverse link 120, and forward link 124 can employ a different frequency band than that employed by reverse link 126, for example. Further, in a time division duplex (TDD) system, forward link 118 and reverse link 120 can utilize a common frequency band and forward link 124 and reverse link 126 can utilize a common frequency band.

Each group of antennas and/or the area in which they are designated to communicate can be referred to as a sector of base station 102. For example, antenna groups can be designed to communicate to mobile devices in a sector of the areas covered by base station 102. In communication over forward links 118 and 124, the transmitting antennas of base station 102 can utilize beam-forming to improve signal-to-noise ratio of forward links 118 and 124 for mobile devices 116 and 122. This can be provided by using a precoder to steer signals in desired directions, for example. Also, while base station 102 utilizes beam-forming to transmit to mobile devices 116 and 122 scattered randomly through an associated coverage, mobile devices in neighboring cells can be subject to less interference as compared to a base station transmitting through a single antenna to all its mobile devices. Moreover, mobile devices 116 and 122 can communicate directly with one another using a peer-to-peer or ad hoc technology in one example.

According to an example, system 100 can be a multiple-input multiple-output (MIMO) communication system. Further, system 100 can utilize substantially any type of duplexing technique to divide communication channels (e.g., forward link, reverse link, etc.) such as FDD, TDD, and the like. Moreover, the system 100 can be a multiple-bearer system. A bearer can be an information path of defined capacity, delay, bit error rate, etc. Mobile devices 116 and 122 can each serve one or more radio bearers. The mobile devices 116 and 122 can employ uplink rate control mechanisms to manage and/or share uplink resources across the one or more radio bearers. In one example, the mobile devices 116 and 122 can utilize token bucket mechanisms to serve the radio bearers and to enforce uplink rate limitations.

Pursuant to an illustration, each bearer can have an associated prioritized bit rate (PBR), maximum bit rate (MBR) and guaranteed bit rate (GBR). The mobile devices 116 and 122 can serve the radio bearers based, at least in part, on the associated bit rate values. The bit rate values can also be employed to calculate queue sizes that account for PBR and MBR for each bearer. The queue sizes can be included in uplink resource requests transmitted by the mobile devices 116 and 122 to the base station 102. The base station 102 can schedule uplink resources for mobile device 116 and 122 based upon respective uplink requests and included queue sizes.

Figure 2:
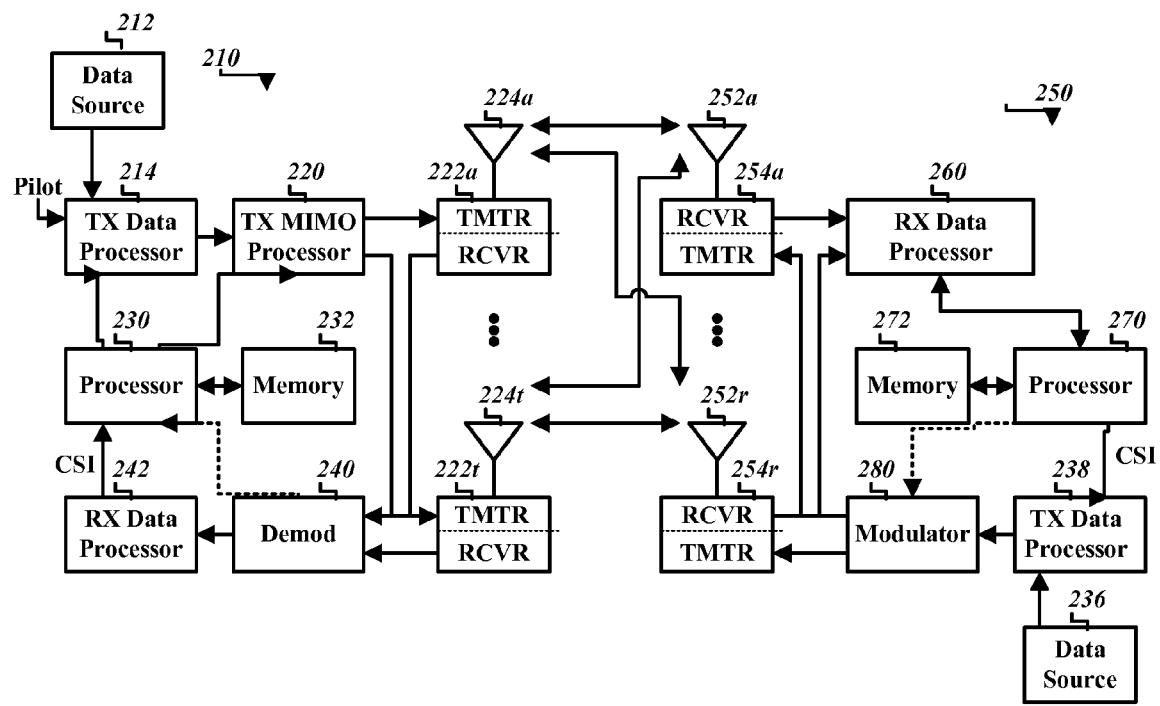
FIG. 2 illustrates an example generals block diagram of a communication system in accordance with an aspect of the subject specification.

FIG. 2 is a block diagram of a transmitter system 210 (also known as the access point) and a receiver system 250 (also known as access terminal) in a MIMO system 200. At the transmitter system 210, traffic data for a number of data streams is provided from a data source 212 to a transmitter (TX) data processor 214.

In an embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides NT modulation symbol streams to NT transmitters (TMTR) 222a through 222t. In certain embodiments, TX MIMO processor 220 applies beam-forming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. NT modulated signals from transmitters 222a through 222t are then transmitted from NT antennas 224a through 224t, respectively.

At receiver system 250, the transmitted modulated signals are received by NR antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the NR received symbol streams from NR receivers 254 based on a particular receiver processing technique to provide NT "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beam-forming weights then processes the extracted message.

Figure 3:
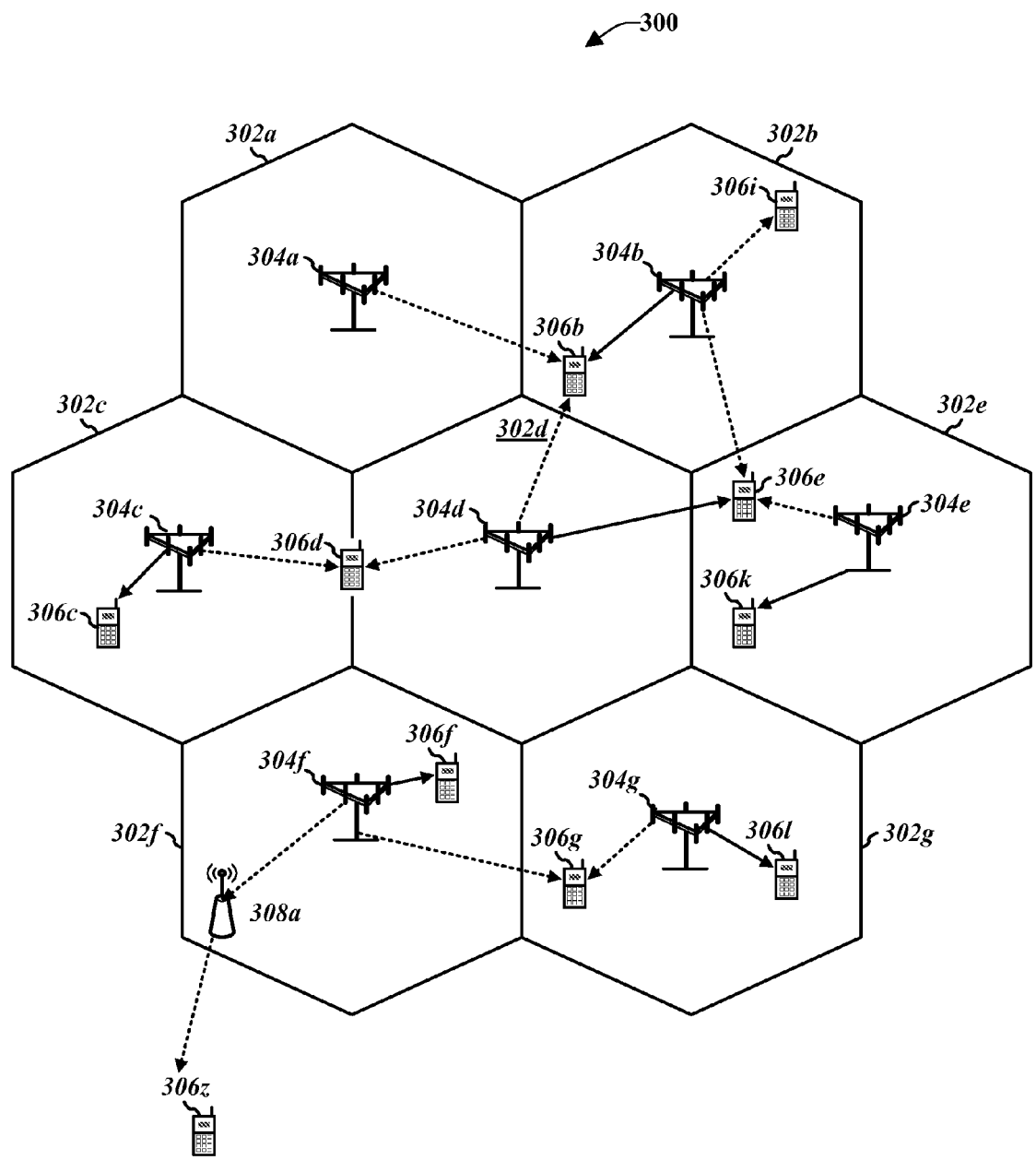
FIG. 3 illustrates an example wireless communication system in accordance with an aspect of the subject specification.

FIG. 3 illustrates an example wireless communication system 300 configured to support a number of users, in which various disclosed embodiments and aspects may be implemented. As shown in FIG. 3, by way of example, system 300 provides communication for multiple cells 302, such as, for example, macro cells 302a-302g, with each cell being serviced by a corresponding access point (AP) 304 (such as APs 304a-304g). Each cell may be further divided into one or more sectors (e.g. to serve one or more frequencies). Various access terminals (ATs) 306, including ATs 306a-306k, also known interchangeably as user equipment (UE) or mobile stations, are dispersed throughout the system. Each AT 306 may communicate with one or more APs 304 on a forward link (FL) and/or a reverse link (RL) at a given moment, depending upon whether the AT is active and whether it is in soft handoff, for example. The wireless communication system 300 may provide service over a large geographic region, for example, macro cells 302a-302g may cover a few blocks in a neighborhood.

In accordance with an embodiment of the present innovation, the system 300 can include one or more relay stations (RS), such as RS 308a. In operation, the RS can have a connection to both an AP 304 and an AT 306. For example, the RS 308a may be in the middle, between, or otherwise communicatively connecting the AP 304f and the AT 306z. The RS 308a can be a forward and decode relay that interprets, deciphers, or otherwise decodes a signal received from the AP 304f, and transmits the signal to the AT 306z. It is to be appreciated that the system 300 is shown as having a single RS 308a for simplicity and brevity of explanation, however the system 300 can include most any number of RSs. Additionally or alternatively, one or more of the ATs 306 can function as a RS.

The functionality of the RS 308a can be a mix or combination of the functionality of a AP 304 and an AT 306. For instance, the RS 308a can function similar to a AP 304 when communicating to a downstream node (e.g., AT 306), wherein the RS 308a transmits on the downlink (DL) and receives on the uplink (UL). Additionally, the RS 308a can function similar to an AT 306 when communicating to an upstream node (e.g., AP 304), wherein the RS 308a transmits on the UL and receives on the DL. The AP 304 can control the manner in which the RS 308 is oriented in each slot. For instance, the AP 304 can determine when the RS 308 is oriented as a BS (e.g., downstream) or an AT (e.g., upstream), and can schedule the network resources in order to facilitate multi-hop communication. Furthermore, the AP 304 can determine which of a plurality of RS 308 that each UT 306 can connect with, and maintain independent control for each RS 308.

A device having the combined functionality of both an access terminal and an access point (e.g., base station) can be relatively costly. One way that the cost can be kept down, for example, is by not enabling the device to listen to the AP 304, and transmit to the AT 306 at the same time. As an alternative, synchronizing, coordinating or otherwise scheduling (discussed infra) the use of network resources over multiple hops can be employed for efficient operation. For example, in a static partitioning arrangement the APs 304 can determine which nodes have access to various network resources at different times (e.g., slots). Additionally or alternatively, the network resources can be dynamically partitioned based at least in part on necessity. For instance, the RSs 308 can listen (e.g., receive data) on any FL slot (e.g., listen to the AP 304), unless the RSs 308 have decoded data to forward to one or more ATs 306.

There are three primary considerations in determining how downstream hops are managed, wherein a downstream hop is any hop not involving the AP 304. First, whether the allocation of resources is static or dynamic. As discussed above, static allocation is a fixed partitioning in time of resources on DL and UL between hops, while dynamic allocation involves assigning the resources in time as needed on DL and UL for each hop. Second, whether the allocation of resources is going to be centralized or distributed. The allocation is centralized if the transmission and/or reception for downstream hops are scheduled by the AP 304. The allocation is distributed is the transmission/reception for downstream hops are scheduled by the parent RS 308. Third, whether the allocation will be transparent or explicit. In the transparent case, the UE listens directly to the AP 304, and the RS 308 does not transmit control information, such as DL or UL assignments. Conversely, when the allocation of resources is explicit the RS 308 does transmit control information. For example, the RS 308 can transmit assignments on the packet data control channel (PDCCH) in an LTE system, when the allocation of resources is explicit. It is to be appreciated that this is but one example, and a plurality of examples are possible within the scope and spirit of the subject innovation.

Figure 4:
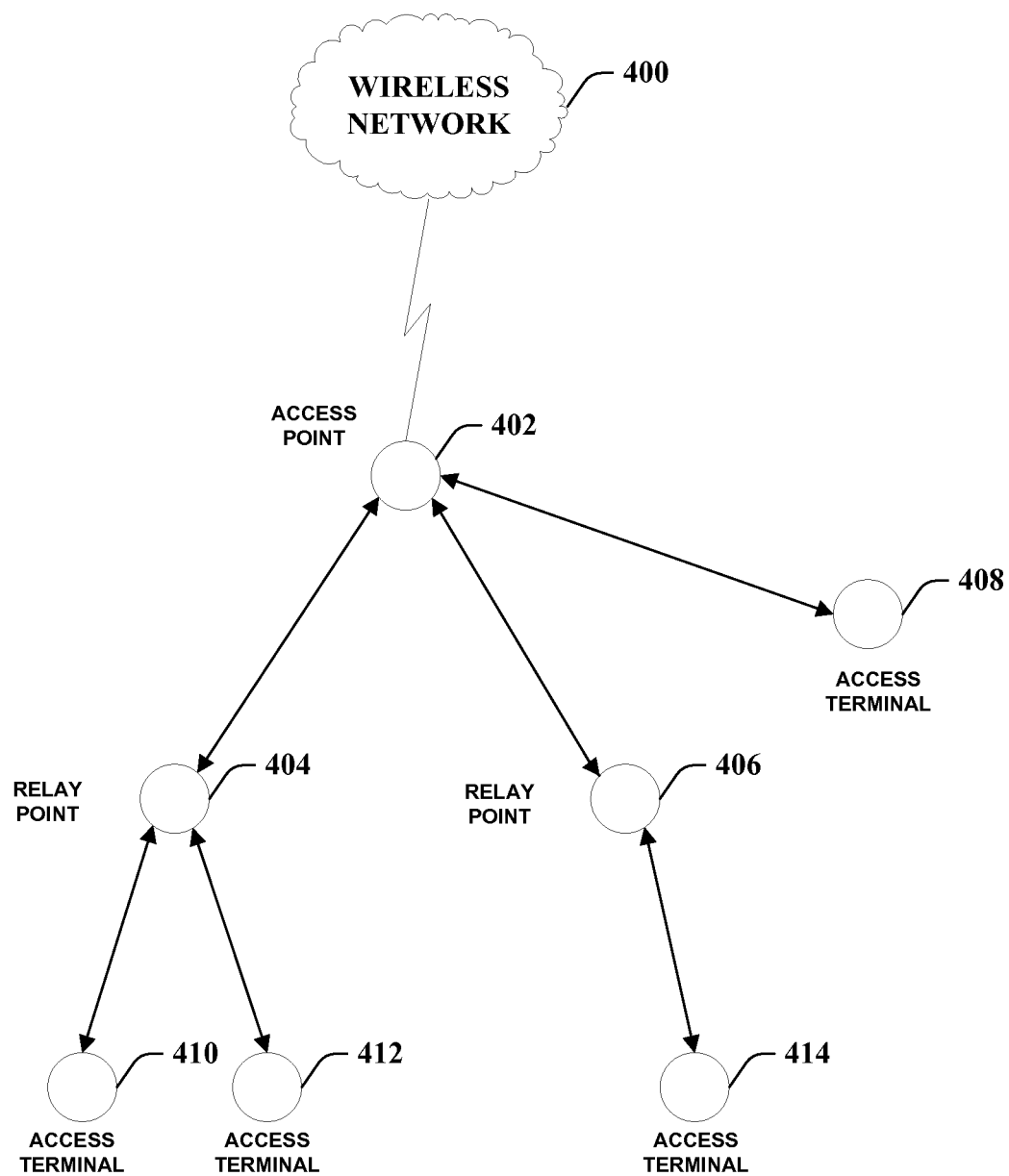
FIG. 4 illustrates an example conceptual diagram of a wireless communication network in accordance with an aspect of the subject specification.

FIG. 4 illustrates an example conceptual diagram of a wireless communication network in accordance with an aspect of the present innovation. The wireless network 400 is shown in communication with several wireless nodes, generally designated as wireless nodes 402-406 and access terminals 408-414. A wireless node may receive, transmit, or most any combination of the foregoing. For simplicity of explanation, the term "receiving node" may be used to refer to a wireless node that is receiving, and the term "transmitting node" may be used to refer to a wireless node that is transmitting. These designations do not imply that the wireless node is incapable of performing both transmit and receive functions.

A wireless node may function as an access point, a relay point (e.g., relay station), an access terminal, or most any combination thereof. For example, a cluster of the wireless nodes 402-406 function together to provide backhaul services to a number of access terminals 408-414. The cluster includes a wireless node 402 that functions as an access point by providing a backhaul connection to the network 400 (e.g., a WWAN such as a cellular network, a WLAN, an ISP, the Internet, etc.). In addition, the wireless node 402 can function as a relay point for other access points not shown in the example FIG. 4, or provide a relay function in response to a dynamic reconfiguration of the wireless network 400. The cluster also includes two wireless nodes 404 and 406 that function as relay points to connect the access terminals 410-414 to the access point 402. Although not shown, the wireless nodes 404 and 406 can also provide connectivity to other access points and relay points. The same wireless nodes 404 and 406 may function as access points for other clusters of wireless nodes in the network 400.

Four access terminals 408-414 are shown in FIG. 4. In this example, two access terminals 410 and 412 are connected to the access point 402 through the relay point 404, one access terminal 414 is connected to the access point 402 through the relay point 406, and the remaining access terminal 418 is connected directly to the access point 402. The access terminals 408-414 can be most any mobile user device capable of supporting radio communications with a wireless node 402 including, by way of example, a mobile or cellular phone, a personal digital assistant (PDA), a laptop computer, a digital audio device (e.g., an MP3 player), a game console, a digital camera, or other voice, data, audio, video, messaging, or multimedia device. In some applications, the access terminals 408-414 can also function as an access point and/or relay point for other wireless nodes in the network 400.

The air interface specification used or adopted to support the wireless network 400 can be based on most any suitable multiple access technology that enables mobile subscribers to share the available radio resources. Examples of such multiple access technologies include Time Division Multiple Access (TDMA), Frequency Division Multiple Access (FDMA), CDMA, Wideband CDMA (W-CDMA), Orthogonal Frequency Division Multiple Access (OFDMA), or some combination thereof.

Each wireless node in the network 400 may have multiple downlink connections. In this configuration, each wireless node with multiple downlink connections may need to coordinate the sharing of radio resources between the downstream wireless nodes (e.g., frequency bands, spreading codes, etc.). By way of example, the access point 402 allocates available radio resources between the access terminal 408 and the two relay points 404 and 406, and the relay point 404 allocates available radio resources between the two access terminals 410 and 412. In this example, the access point 402 and the relay point 404 may employ a scheduling algorithm to allocate radio resources. The scheduling algorithm may be as simple as a first-come first-serve process. Alternatively, a channel-dependent algorithm may be used to take advantage of favorable channel conditions. A simpler best effort scheduling algorithm may be used based on a fairness, whereby the wireless node for each downlink connection is given equal bandwidth, or in the case where there are a large number of wireless nodes with a downlink connection, a round-robin process in which the bandwidth is cycled between the wireless nodes in a fair way. Those skilled in the art will be readily able to determine a scheduling algorithm for any particular application of a wireless network.

Figure 5:
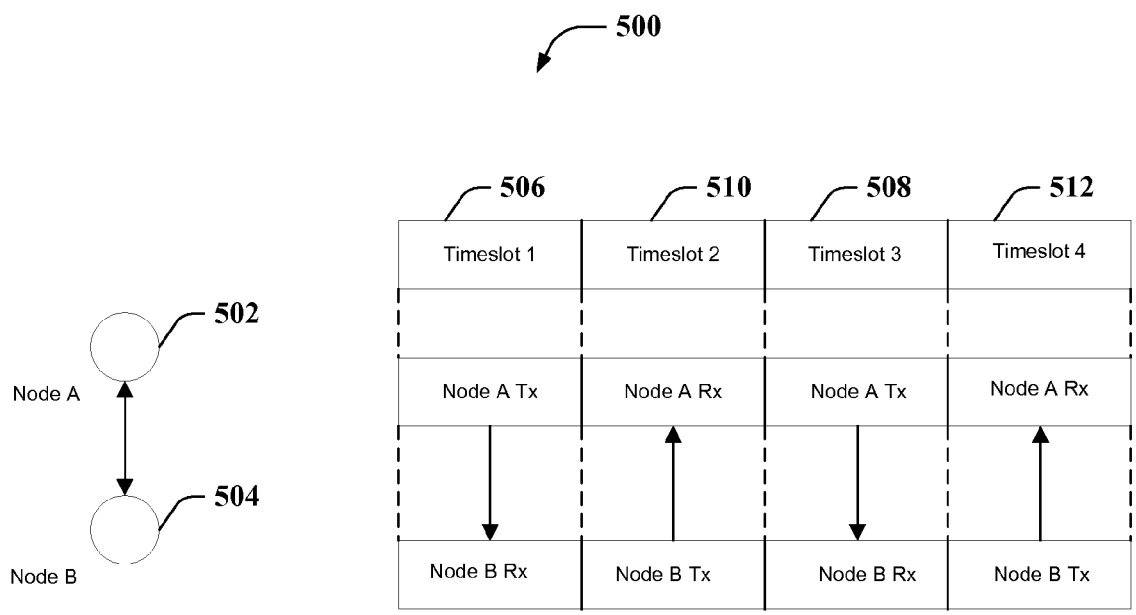
FIG. 5 illustrates an example conceptual diagram of content flows associated with transmit and receive timeslots in a single hop communication network in accordance with an aspect of the subject specification.

FIG. 5 illustrates an example conceptual diagram of content flows associated with transmit and receive timeslots in a single hop communication in accordance with an aspect of the subject innovation. For example, Referring to FIG. 5, content is transmitted from a wireless node A 502 to a wireless node B 504. The wireless nodes A 502 and B 504 are allowed to transmit and receive during certain timeslots. For example, the wireless node A 502 can transmit during Timeslot 1 506 and/or Timeslot 3 508 (e.g., odd numbered timeslots, odd frames, or odd interlaces) and the wireless node B may transmit during Timeslot 2 510 and/or Timeslot 4 512 (e.g., even numbered timeslots, even frames, or even interlaces). Conversely, the wireless node A may receive during the even numbered timeslots/frames and the wireless node B may receive during odd numbered timeslots/frames.

In some implementations, multiple channels may be established in each timeslot. For instance, in a hybrid TDMA/FDMA scheme, several frequency bands may be used within each timeslot to support simultaneous communications with multiple wireless nodes. In another example, several spreading codes may be used in a hybrid TDMA/CDMA scheme, thus enabling simultaneous communications during a single timeslot with the content for each communication being spread with a different code. It is to be appreciated that this is but one example, and those skilled in the art will readily understand how to best divide up the radio resources using various multiple access technologies suitable for any particular application.

Figure 6:
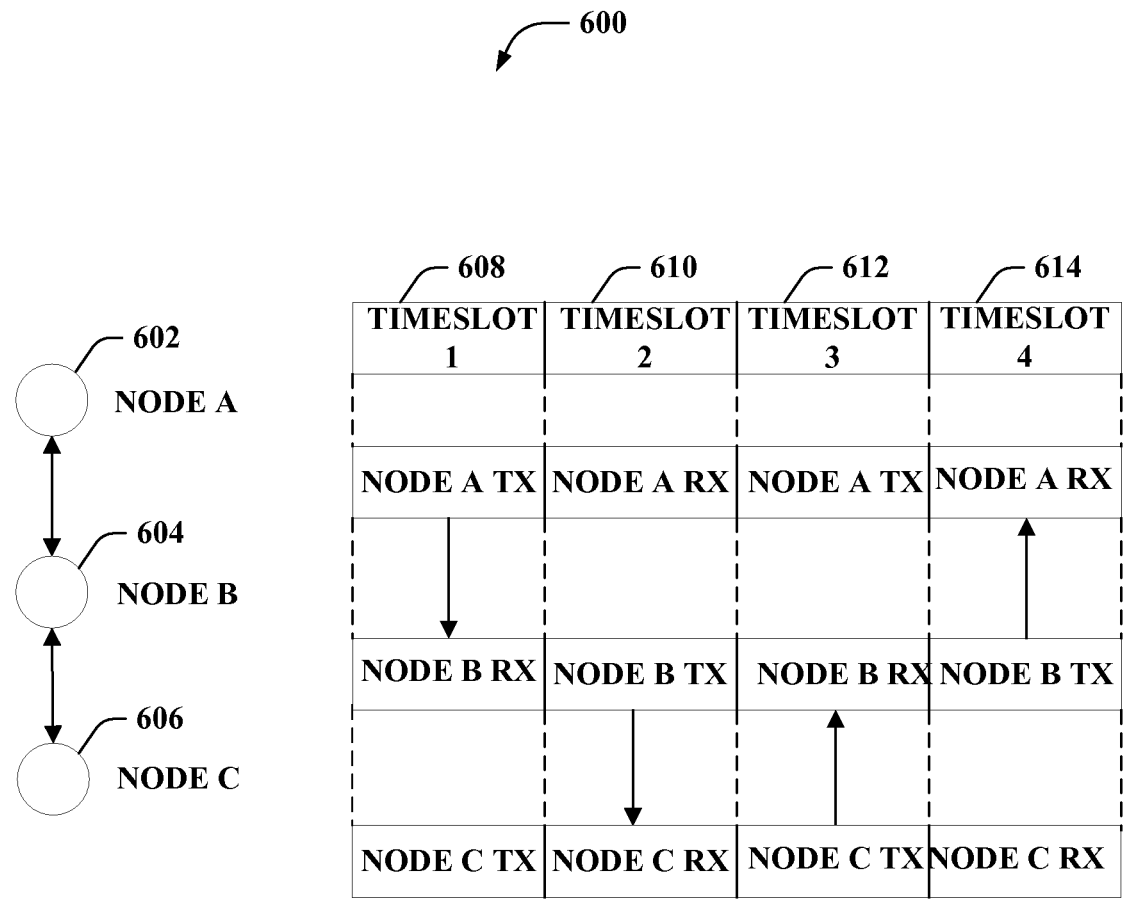
FIG. 6 illustrates an example conceptual diagram of content flow associated with transmit and receive timeslots in a multiple hop communication network in accordance with an aspect of the subject specification.

FIG. 6 illustrates an example conceptual diagram of content flow associated with transmit and receive timeslots in a multiple hop communication in accordance with an aspect of the present innovation. As an example, content is transmitted from a wireless node A 602 to a wireless node B 604 and then to a wireless node C 606. As discussed previously, in connection with a single hop communication, the wireless nodes 602-606 are allowed to transmit and receive during certain timeslots 608-614. For example, the wireless nodes A 602 and C 606 can transmit during timeslot 1 608 or timeslot 3 612 (e.g., odd numbered timeslots, odd frames, or odd interlaces) and the wireless node B 604 can transmit during timeslot 2 610 and timeslot 4 614 (e.g., even numbered timeslots, even frames, or even interlaces). Conversely, the wireless nodes A 602 and C 606 can receive during even numbered timeslots/frames and the wireless node B 604 can receive during odd numbered timeslots/frames.

Figure 7:
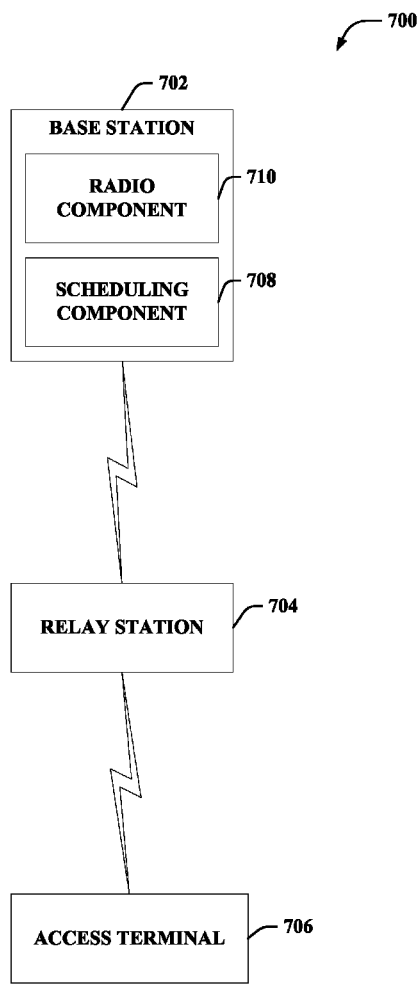
FIG. 7 is an example general component block diagram illustrating a multi-hop wireless communication network is shown in accordance with an aspect of the subject specification.

Turning to FIG. 7, an example general component block diagram illustrating a multi-hop wireless communication network is shown in accordance with an aspect of the present innovation. For simplicity and ease of explanation the following descriptive is informative in nature and broadly defines the functionality of each block. Only the pertinent functionality to various concepts described throughout this disclosure will be described. It is to be appreciated that those skilled in the art will recognize that these functional blocks can provide other functionality that is not described herein and/or can be combined with other components (e.g., functional blocks).

In this example, a system 700 includes a base station 702, a relay station 704, and an access terminal 706. The base station 702 can provide a set of radio resources (e.g., via a radio component 710) to be used by one or more nodes. For example, the nodes can include relay stations 704 or access terminals 706 such as a mobile or cellular phone, a personal digital assistant (PDA), a laptop computer, a digital audio device (e.g., an MP3 player), a game console, a digital camera, or other voice, data, audio, video, messaging, or multimedia devices. In addition, the access terminals 706 can also function as relay stations 704.

The base station 702 includes a scheduling component 708 that can assign the radio resources for use in downlink and uplink communications over multiple hops in a paired manner. For example, in an LTE system, if the downlink data is transmitted on the sub-frame k, then the acknowledgment can be scheduled in sub-frame k+4, where k is an integer. Similarly, if an uplink assignment is transmitted in sub-frame k, uplink data for that assignment can be transmitted in sub-frame k+4, an acknowledgement can be transmitted in sub-frame k+8, and a retransmission, if desired/necessary, can be transmitted in sub-frame k+12. In other words, the scheduling component can assign downlink resources for a relay station 704 to access terminal 706 hop on sub-frame k, and simultaneously assign uplink resources on the access terminal 706 to relay station 704 hop on the paired sub-frame (e.g., sub-frame k+4).

The scheduling component 708 can assign the radio resources using a plurality of schemes. For example, the scheduling component can employ, execute, or otherwise use a distributed scheduling scheme for allocation of the radio resources, wherein the scheduling component 708 determines the resources that the relay station 704 can use for scheduling the access terminal 706, and the relay station 704 autonomously schedules the access terminal 706 on the resources. Additionally or alternatively, the scheduling component 708 can employ a centralized scheduling scheme for the allocation of the radio resources, wherein the scheduling component 708 determines the scheduling of resources for the access terminal 706 associated with the relay station 704. Furthermore, the scheduling component can statically or dynamically assign the radio resources as discussed previously.

Figure 8:
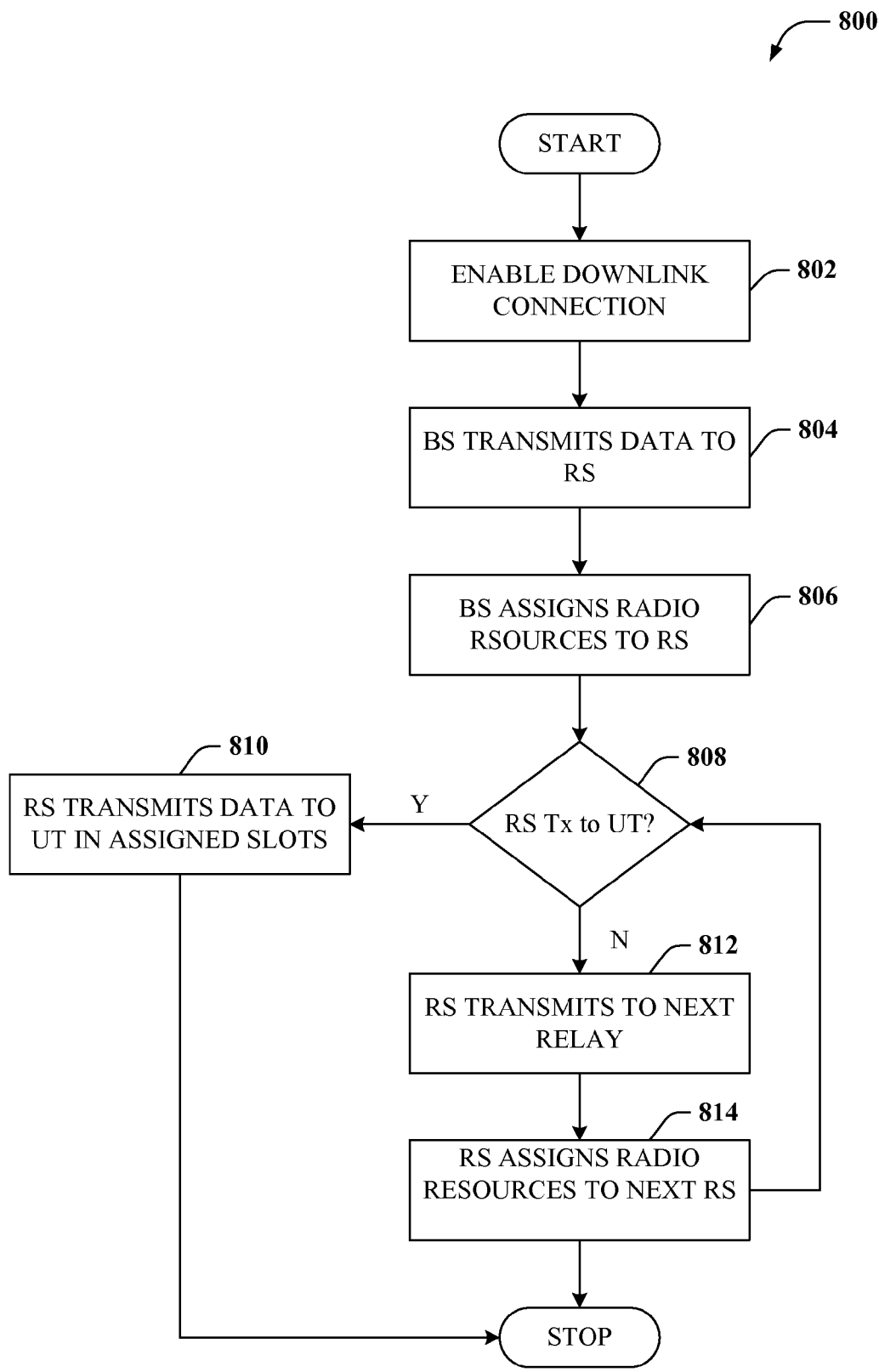
FIG. 8 illustrates an example methodology for static radio resource allocation over multiple hops in a wireless communication network in accordance with an aspect of the subject specification.

FIG. 8 illustrates an example methodology for static radio resource allocation over multiple hops in a wireless network in accordance with an aspect of the present innovation. While, for purposes of simplicity of explanation, the methodologies are shown and described as a series or number of acts, it is to be understood and appreciated that the subject innovation is not limited by the order of acts, as some acts may, in accordance with the subject innovation, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the subject innovation.

At 802, a downlink wireless connection is enabled that allows a first node to communicate with a second node. As discussed previously, the first node can be a relay station (RS), and the second node can be an access terminal (AT). The RS can decode and forward data received from a base station (BS) to the AT, wherein the RS may have a better connection to the BS than the AT. For instance, the RS can be physically located between the BS and the AT.

At 804, the BS transmits a set of data (e.g., content) to the RS ultimately intended for one or more ATs. For instance, the BS can transmit content to the RS intended for a plurality of ATs serviced by the RS, as discussed previously. At 806 the BS can assign a set of radio resources to be used by the AT to forward the data to the ATs. For example, the BS can assign even frames on the uplink (UL) and/or downlink (DL) for communication between the BS and RS, and the BS can assign the odd frames for communication between the RS and AT. For each of the UL and DL transmissions, the BS assigns the corresponding control slots as well. For example, if the BS assigns a DL slot to a downstream transmission from the RS to AT, then the BS will also assign the corresponding UL slot to the RS to receive the acknowledgement message (ACK).

At 808, a determination is made whether the RS is forwarding the data from the BS to the AT or to another RS. At 810, if the RS is forwarding the data to the AT, then the RS forwards the data in the slots assigned by the BS. However, at 812, if the RS is forwarding the data to one or more downstream RSs and there is distributed management of downstream hops, then the RS acts as a BS and forwards the data to the downstream RSs. In addition, at 814 the RS assigns the radio resources to be used by the downstream RSs from the resources available to the RS. For example, the RS can partition the slots assigned to it by the BS for use by the downstream RSs. In addition, the static allocation of radio resources can be reassigned at a later time based on the loading on each hop and/or throughput imbalance.

Figure 9:
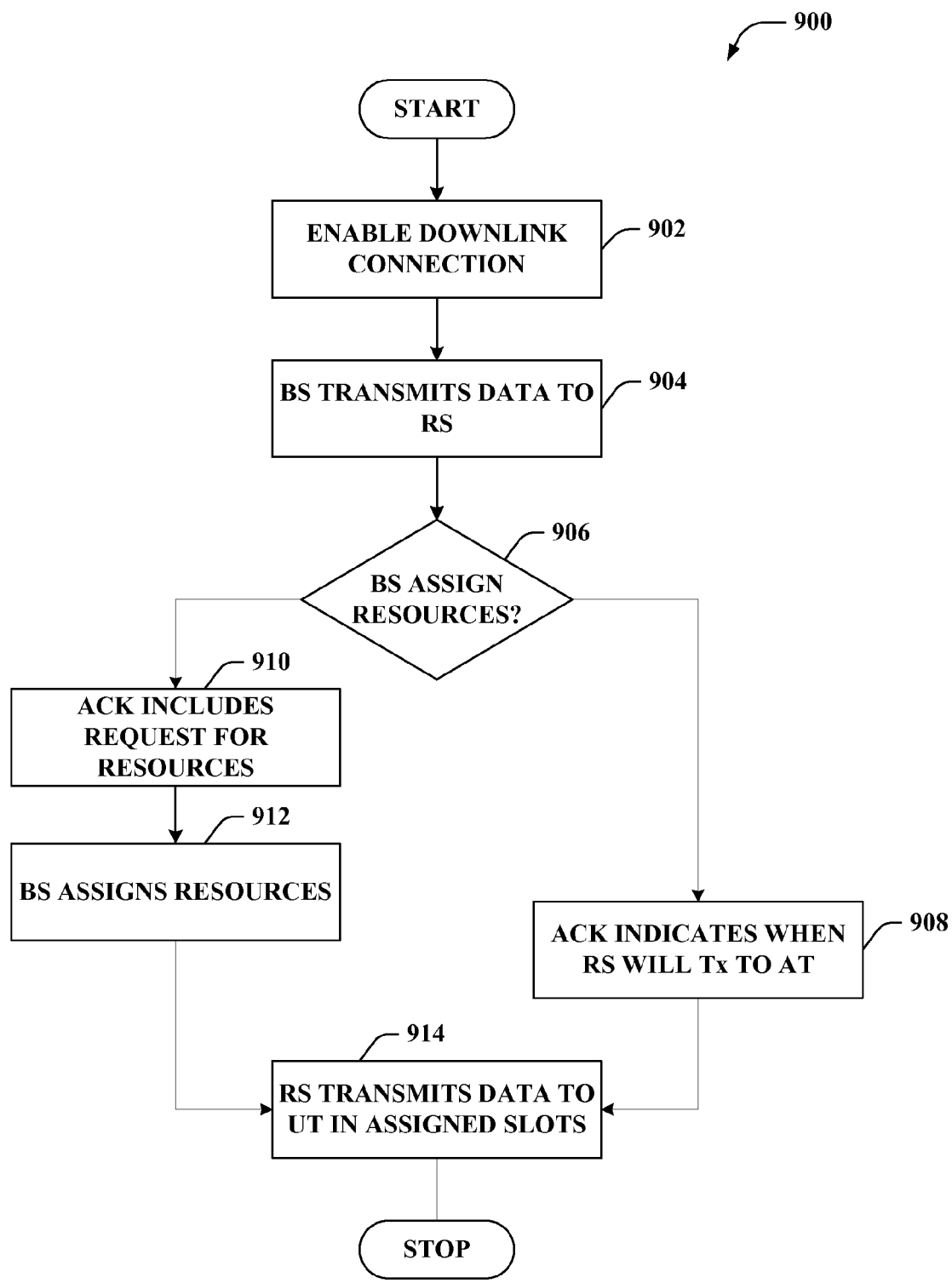
FIG. 9 illustrates an example methodology for dynamically allocating radio resources over multiple hops in a wireless communication network in accordance with an aspect of the subject specification.

FIG. 9 illustrates an example methodology for dynamically allocating radio resources over multiple hops in a wireless network in accordance with an aspect of the present innovation. At 902, a downlink wireless connection is enabled that allows a first node to communicate with a second node. As discussed previously, the first node can be a relay station (RS), and the second node can be an access terminal (AT). The RS can decode and forward data received from a base station (BS) to the AT, wherein the RS may have a better connection to the BS than the AT. For instance, the RS can be physically located between the BS and the AT.

At 904, the BS transmits a set of data (e.g., content) to the RS ultimately intended for one or more ATs. For instance, the BS can transmit content to the RS intended for a plurality of ATs serviced by the RS, as discussed previously. At 906, a determination is made whether the RS or BS is determining the radio resources that will be used to forward the data downstream. If the BS is determining how the radio resources will be scheduled for downstream hops then the management of the radio resources is centralized (discussed supra). If the RS is going to schedule the resources for the downstream hops then the management of the radio resources is distributed.

At 908, if the RS is determining the radio resources that will be used to forward the data downstream (e.g., distributed management), then the acknowledgement message (ACK) sent to the BS confirming receipt of the data can include information regarding when the RS will transmit the data to the AT, the number of slots required, and/or a delay if the BS to RS link is slower than the RS to AT link. In order to account for any latency, the BS may require a buffer time to decode the ACK before the RS forwards the data to the AT.

At 910, if the BS is determining the radio resources that will be used to forward the data downstream (e.g., centralized management), then the acknowledgement message (ACK) sent to the BS confirming receipt of the data can include a request resources. The request can include the number of slots required, and/or a delay if the BS to RS link is slower than the RS to AT link. At 912, the BS assigns the radio resources to the RS for transmitting the data downstream. At 914, the RS transmits the data downstream in the assigned slots. For example, the RS can forward the data obtained from the BS to one or more ATs in the slots assigned by the BS (e.g., distributed management), or indicated to the BS by the RS (e.g., centralized management).

In view of the exemplary systems and methodologies described supra, one or more embodiments of the current innovation that may be implemented in accordance with the disclosed subject matter will be better appreciated with reference to the timeline diagrams of FIGS. 10-13. While for purposes of simplicity of explanation, the timeline diagrams are shown and described as a series of slots, it is to be understood and appreciated that the claimed subject matter is not limited by the order and/or number of the slots. Moreover, the illustrated slots do not represent all possible implementations of the subject innovation, and the examples illustrated are not intended to be optimized or exhaustive of the configurations within the scope and spirit of the subject innovation.

Figure 10:
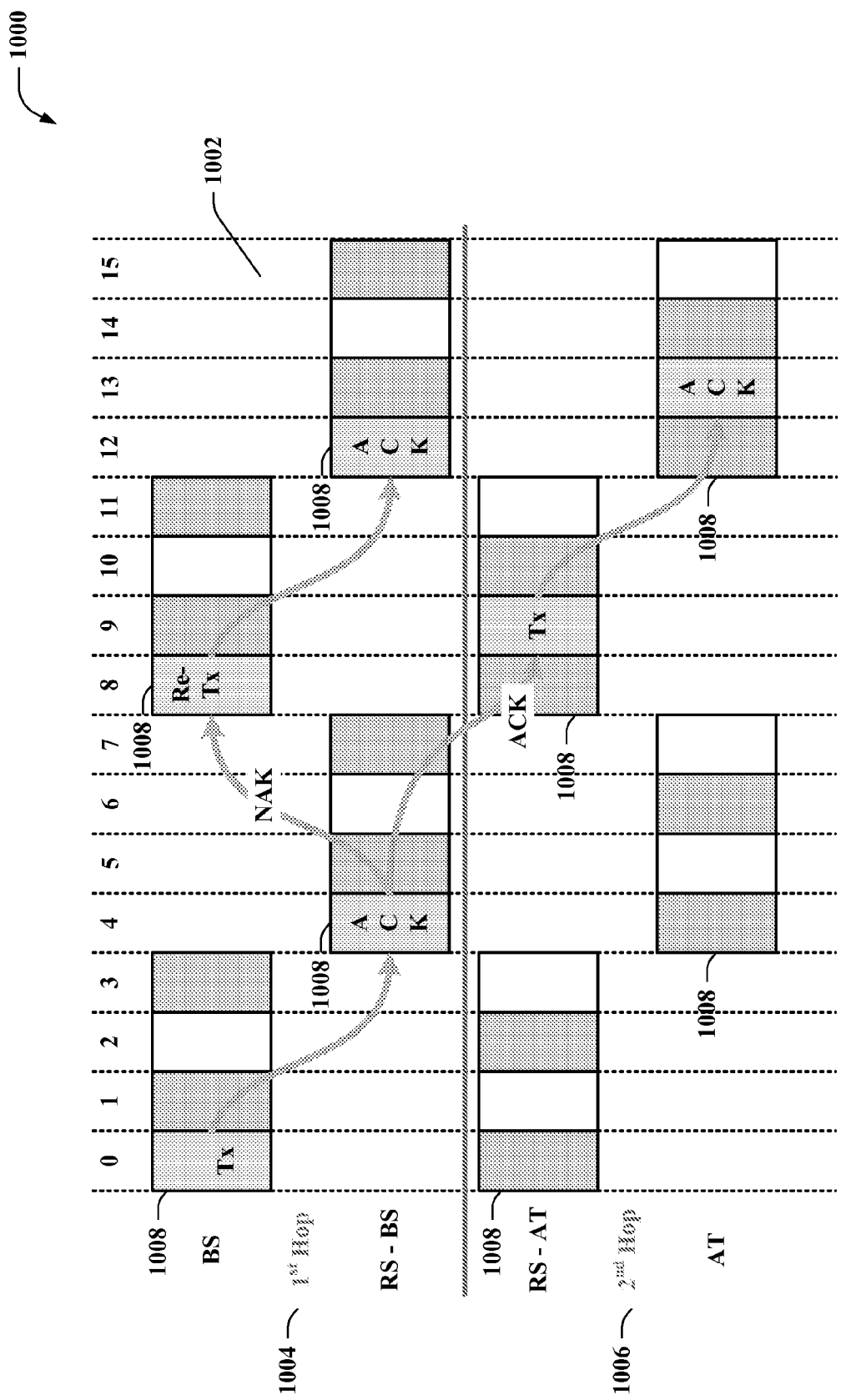
FIG. 10 is an example downlink timeline illustrating statically allocated radio resources over multiple hops in a wireless communication network in accordance with an aspect of the subject specification.

FIG. 10 is an example downlink timeline illustrating statically allocated radio resources over multiple hops in a wireless network in accordance with an aspect of the present innovation. The timeline 1000 includes sixteen individual frames 1002 (e.g., 0-15). As discussed previously, in a static centralized implementation a base station can assign the sub-frames that one or more relay stations (RS) can use to send and/or receive data. For example, the sets of even sub-frames can be assigned to BS and RS communication (e.g. first hop) 1004, while the sets of odd sub-frames are assigned to BS and AT communication (e.g., second hop) 1006.

In operation, the BS transmits data to the one or more RSs beginning in sub-frame 0. The RS will send an acknowledgement (ACK) message in sub-frame 4 if the data is received and decoded correctly, or a negative acknowledgement (NACK) message if the data is not received correctly. If the BS receives a NACK then the data is retransmitted to the RS beginning in the next interlace (e.g., sub-frame 8). If the RS successfully received the data then the RS can transmit the data downstream to one or more access terminals (AT) in the next available slot (e.g., slot 9). As discussed previously, the corresponding control sub-frame (e.g., sub-frame 13) will also be assigned to the RS so that it can receive an ACK from the AT.

Additionally or alternatively, in the current example the BS can use a split from 3:1 to 1:3 (for example) if the throughput on the links between the BS and RS or RS and AT are not evenly matched.

Figure 11:
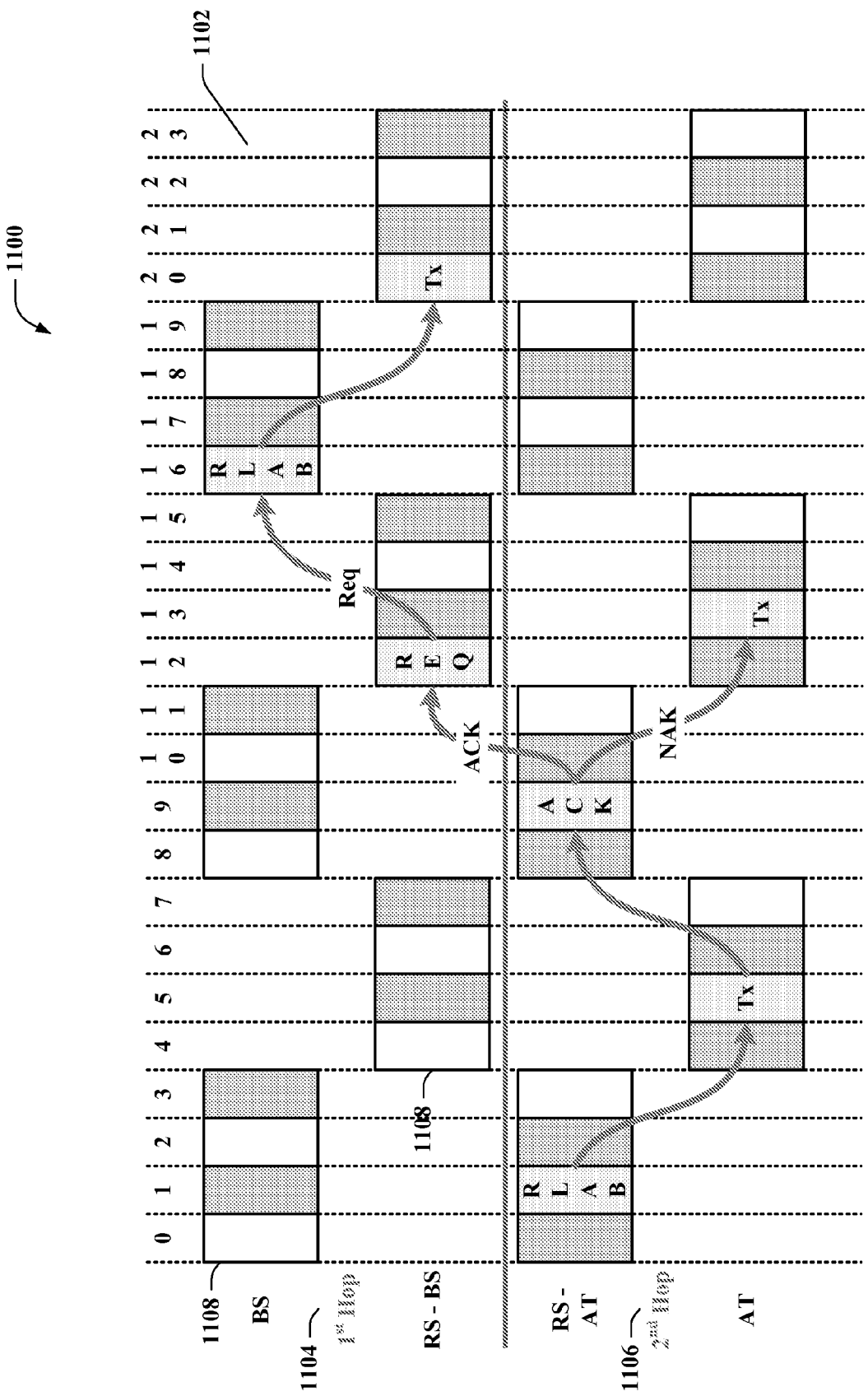
FIG. 11 is an example uplink timeline illustrating statically allocated radio resources over multiple hops in a wireless communication network in accordance with an aspect of the subject specification.

FIG. 11 is an example uplink timeline illustrating statically distributed radio resources over multiple hops in a wireless network in accordance with an aspect of the present innovation. The timeline 1100 includes twenty four individual frames 1102 (e.g., 0-23). As discussed previously, in a static centralized implementation a base station (BS) can assign the sub-frames that one or more relay stations (RS) can send and/or receive data. For example, the even sets of sub-frames can be assigned to BS and RS communication (e.g. first hop) 1104, while the odd sets of sub-frames are assigned to RS and AT communication (e.g., second hop) 1106.

In operation, the example illustrates a scenario in which a RS is granting a prior request by an AT to transmit data on the UL at slot 1. The grant request is transmitted by the RS in slot 1, because the odd sets of sub-frames are assigned to RS and AT communication. The AT can begin transmitting the data at the next available sub-frame (e.g., sub-frame 5). At sub-frame 9 the RS can send an ACK if the data is successfully received and decoded or a NAK if the data is not successfully received. If the data is not successfully received then the AT will transmit the data in the first available assigned sub-frame (e.g., sub-frame 13) following receipt of the NAK. If the data is successfully received then the RS can transmit a request to use the radio resources to the BS at sub-frame 12 (e.g., even sub-frame). The BS can send a grant to the RS's request in sub-frame 16, and the RS can begin transmitting the data in sub-frame 20. It is to be appreciated that the foregoing example is illustrated for simplicity and clarity of explanation, it is not intended to be exhaustive or optimized or the configurations within the scope and spirit of the subject innovation.

Figure 12:
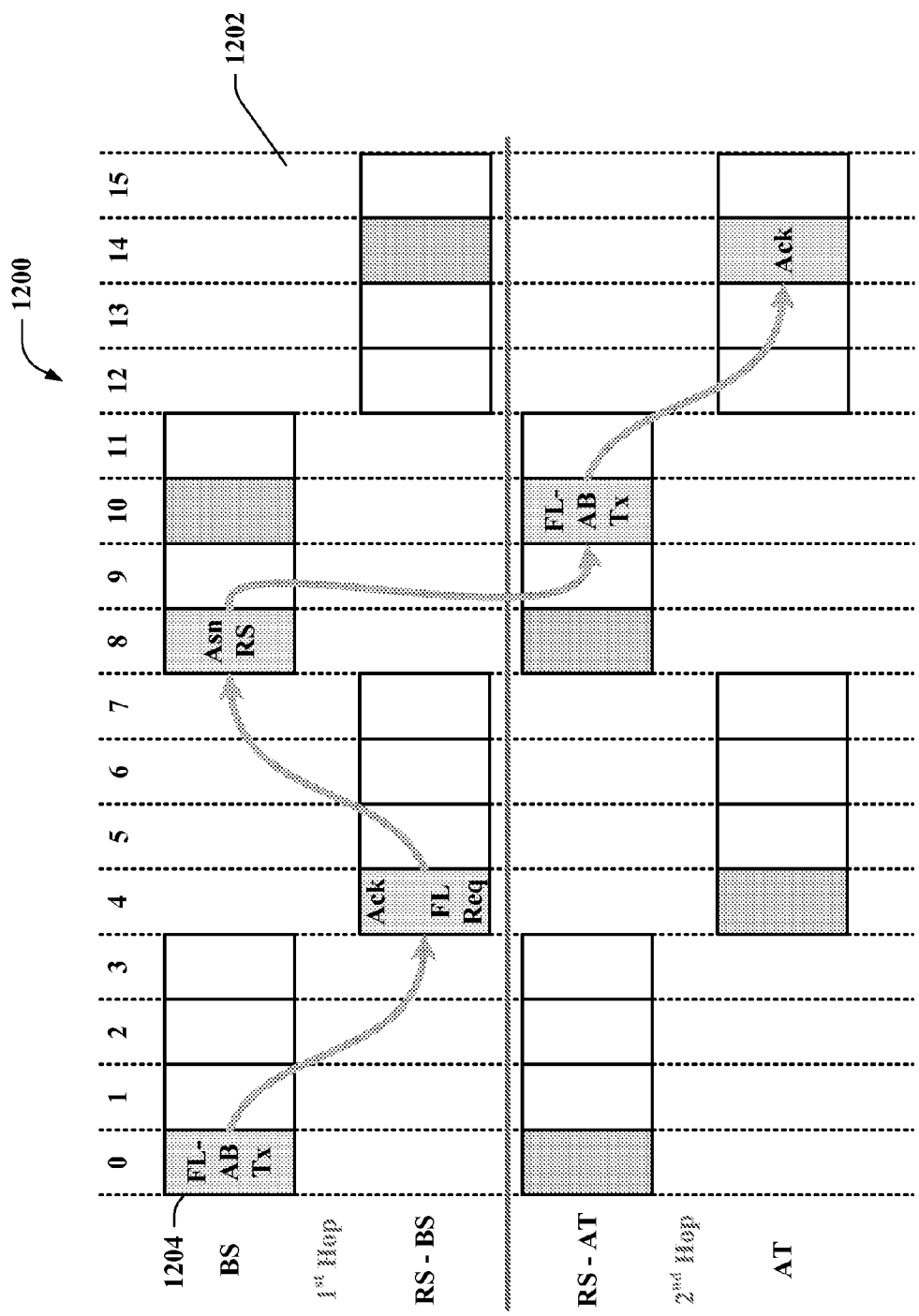
FIG. 12 is an example downlink timeline illustrating a dynamic centralized allocation of radio resources over multiple hops in a wireless communication network in accordance with an aspect of the subject specification.

FIG. 12 is an example downlink timeline illustrating dynamic centralized allocation of radio resources over multiple hops in a wireless network in accordance with an aspect of the current innovation. The timeline 1200 includes sixteen individual frames 1202 (e.g., 0-15). In the current example, the BS transmits data to the RS in sub-frame 0. The RS will send an ACK at sub-frame 4, wherein the ACK includes a forward link (FL) resource request. The FL request can specify the number of frames required, and can also indicate a delay if, for example, the BS and RS link is slower than the RS and AT link.

At sub-frame 8, the BS assigns all or a portion of the requested DL resources (e.g., centralized management) that can be used by the RS to transmit the data downstream (e.g., to the AT), and the RS transmits the data downstream at the next available sub-frame (e.g., slot 10). The DL resources assigned by the BS can be based on a plurality of factors, including but not limited to a channel quality indicator (CQI), signal-to-noise ratio (SNR), signal-to-interference plus noise ratio (SINR), amount of data, available bandwidth, and so forth. At sub-frame 12, the AT can send an ACK to the RS if the data is correctly received and decoded.

Figure 13:
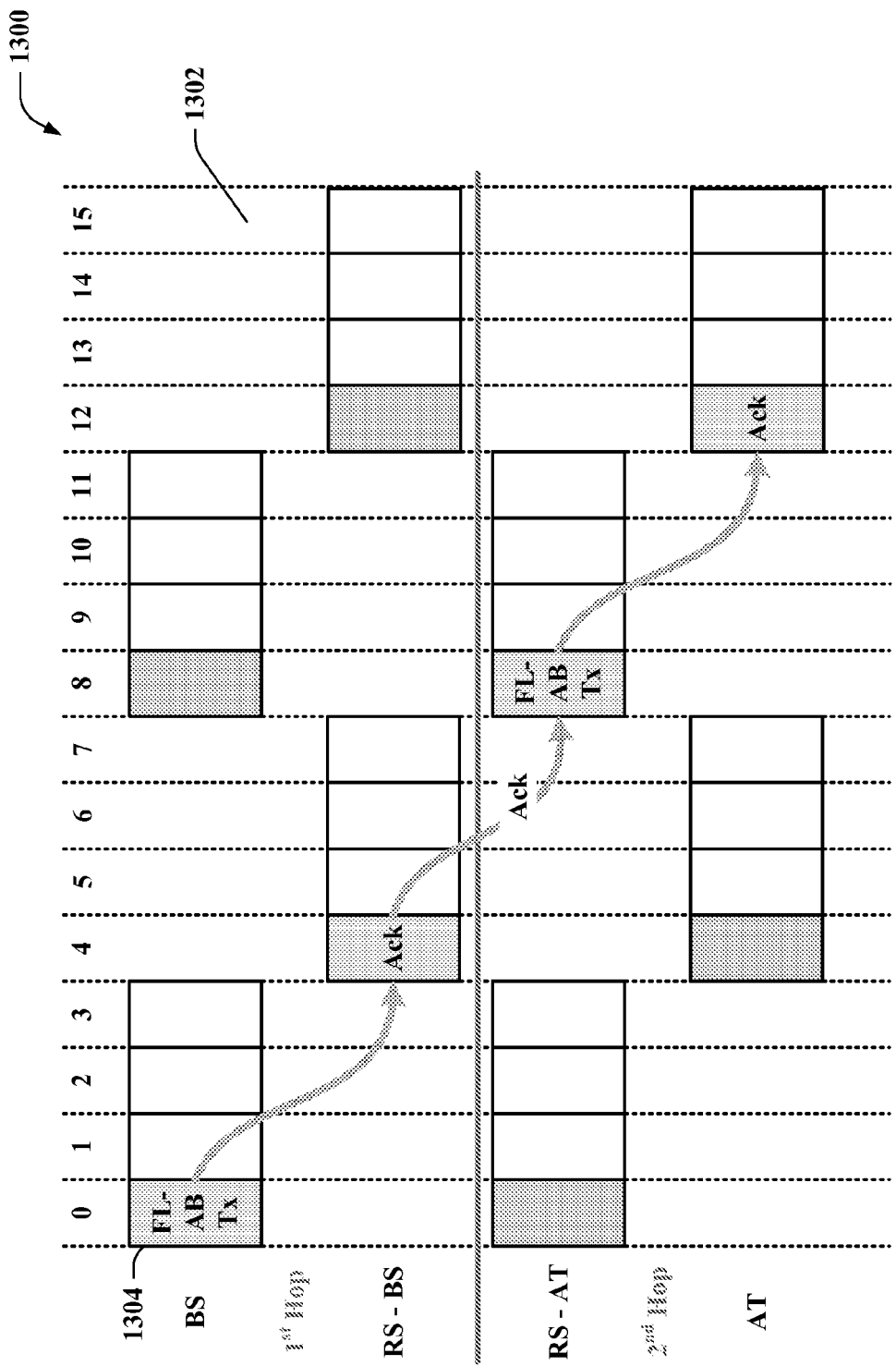
FIG. 13 is an example downlink timeline illustrating a dynamic distributed allocation of radio resources over multiple hops in a wireless network in accordance with an aspect of the subject specification.

FIG. 13 is an example downlink timeline illustrating dynamic distributed allocation of radio resources over multiple hops in a wireless network in accordance with an aspect of the present innovation. The timeline 1300 includes sixteen individual timeslots 1302 (e.g., 0-15). In the current example, the BS transmits data to one or more RSs in sub-frame 0, along with a forward link assignment (FLA) that indicates when the RS will forward the data to one or more ATs. The FLA can specify the number of frames required, and can also indicate a delay if, for example, the BS and RS link is slower than the RS and AT link. The RS sends an ACK at sub-frame 4, and begins transmitting the data downstream to the AT, at sub-frame 8. The BS can require an amount of time to decode the ACK (e.g., latency), so that the BS is aware of when the RS is transmitting.

As previously mentioned, the DL resources assigned by the BS can be based on a plurality of factors, including but not limited to a channel quality indicator (CQI), signal-to-noise ratio (SNR), signal-to-interference plus noise ratio (SINR), amount of data, available bandwidth, and so forth. At sub-frame 14, the AT can send an ACK to the RS if the data is correctly received and decoded.

Figure 14:
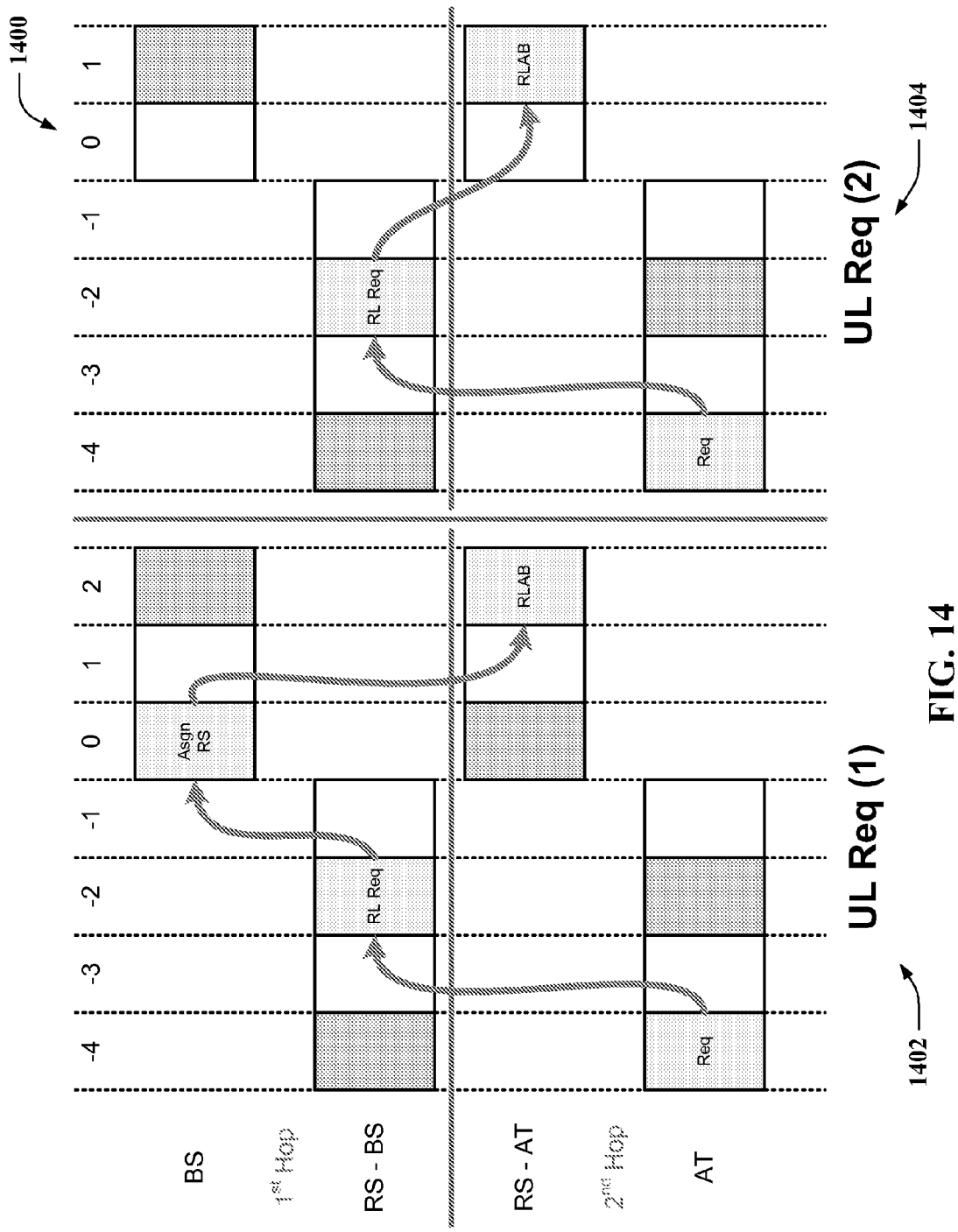
FIG. 14 is an example comparison of two uplink timelines illustrating dynamically allocated radio resources over multiple hops in a wireless network in accordance with an aspect of the subject specification.

Turning now to FIG. 14, an example comparison of two uplink timelines illustrating dynamically allocated radio resources over multiple hops in a wireless network in accordance with an aspect of the present innovation. The illustration 1400 includes a first timeline 1402 and a second timeline 1404. The first timeline 1402 illustrates a centralized dynamic assignment of UL radio resources by a BS. In sub-frame −4 an AT transmits a request for resources to a RS. The RS forwards the request to the BS in sub-frame −2, and in sub-frame 0 the BS transmits an assignment of resources to the RS. The RS forwards the Reverse Link Assignment (RLA) to the AT, at sub-frame 2.

Additionally or alternatively, the radio resources can be assigned by the RS in a dynamic distributed allocation of resources as illustrated on the second timeline 1404. At sub-frame −4, the AT transmits a request for resources to the RS. The RS, at sub-frame −2, transmits an RL request to the BS and AT that indicates when the RS will be receiving data from the AT. The BS may require an amount of time X to account for any latency, and to decode the RL request and identify when the RS is receiving data. The RL request can also include a number of frames required, and/or a delay if the links are mismatched.

Figure 15:
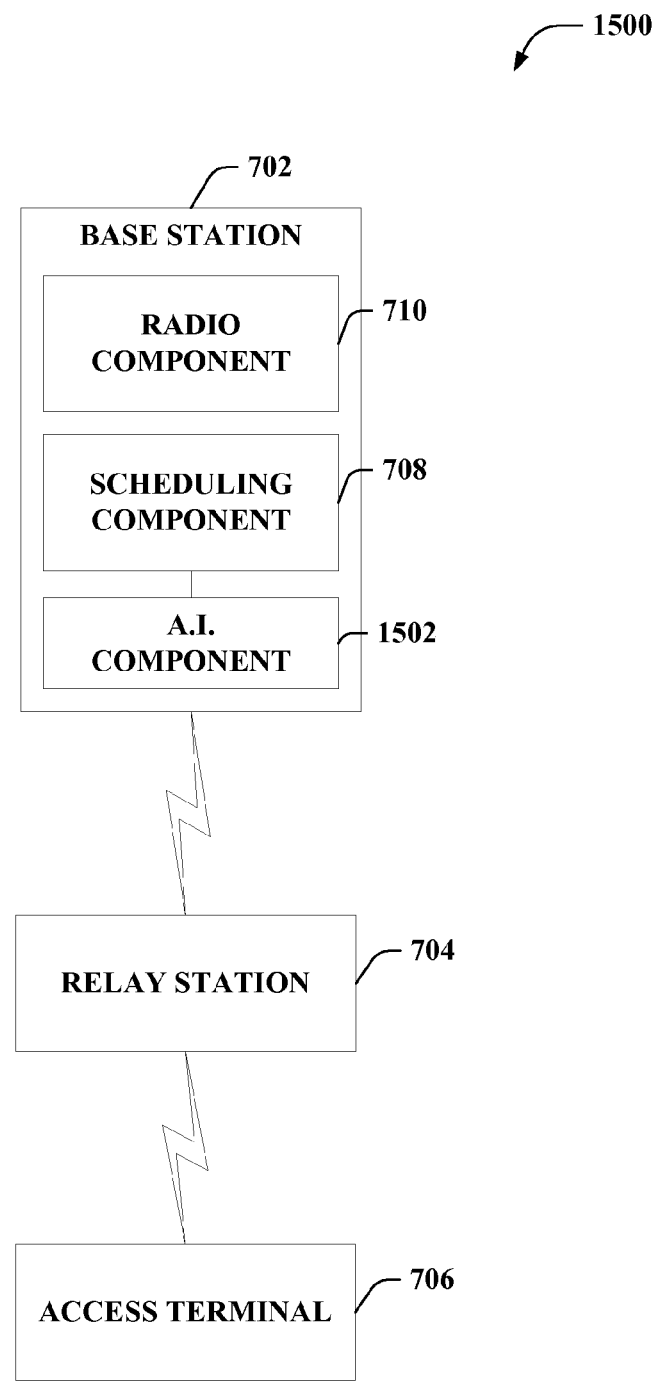
FIG. 15 illustrates a system that employs an artificial intelligence (AI) component that facilitates automating one or more features in accordance with the subject specification.

FIG. 15 illustrates a system 1500 that employs an artificial intelligence (AI) component 1502 that facilitates automating one or more features in accordance with the present innovation. The subject invention (e.g., in connection with inferring) can employ various AI-based schemes for carrying out various aspects thereof. For example, a process for dynamically allocating radio resources can be facilitated via an automatic classifier system and process.

A classifier is a function that maps an input attribute vector, $x=(x1, x2, x3, x7, xn)$, to a confidence that the input belongs to a class, that is, $f(x)=\text{confidence}(\text{class})$. Such classification can employ a probabilistic and/or statistical-based analysis (e.g., factoring into the analysis utilities and costs) to prognose or infer an action that a user desires to be automatically performed.

A support vector machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated from the subject specification, the subject invention can employ classifiers that are explicitly trained (e.g., via a generic training data) as well as implicitly trained (e.g., via observing user behavior, receiving extrinsic information). For example, SVM's are configured via a learning or training phase within a classifier constructor and feature selection module. Thus, the classifier(s) can be used to automatically learn and perform a number of functions, including but not limited to determining according to a predetermined criteria when to update or refine the previously inferred schema, tighten the criteria on the inferring algorithm based upon the kind of data being processed (e.g., financial versus non-financial, personal versus non-personal, . . . ), and at what time of day to implement tighter criteria controls (e.g., in the evening when system performance would be less impacted).

Figure 16:
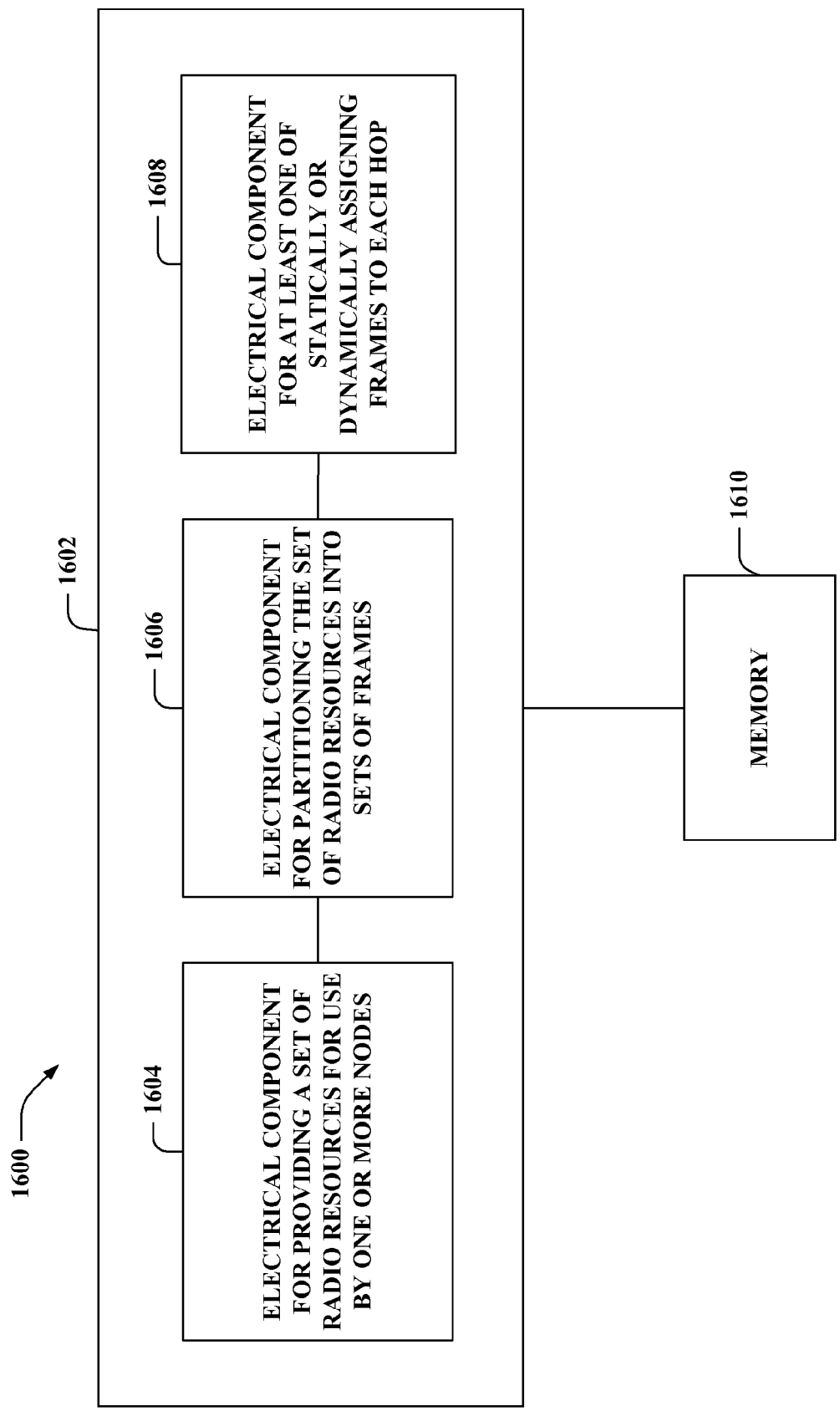
FIG. 16 is an illustration of an example system that facilitates scheduling over multiple hops in a wireless communication network in accordance with the subject specification.

With reference to FIG. 16, illustrated is a system 1600 that facilitates scheduling over multiple hops in a wireless communication network. For example, system 1600 can reside at least partially within a base station, mobile device, etc. It is to be appreciated that system 1600 is represented as including functional blocks, which can be functional blocks that represent functions implemented by a processor, software, or combination thereof (e.g., firmware). System 1600 includes a logical grouping 1602 of electrical components that can act in conjunction. For instance, logical grouping 1602 can include an electrical component for providing a set of radio resources for use by one or more nodes 1604. Further, logical grouping 1602 can comprise an electrical component for portioning the set of radio resources into sets of frames. Moreover, the logical grouping 1602 can include an electrical component for at least one of statically or dynamically assigning frames to each hope, wherein adjacent hopes are assigned orthogonal resources 1608. If the frames are statically assigned then adjacent hops are assigned orthogonal resources, and dynamic assignment of frames is based at least in part on traffic or channel conditions. Additionally, system 1600 can include a memory 1610 that retains instructions for executing functions associated with electrical components 1604, 1606, and 1608. While shown as being external to memory 1610, it is to be understood that one or more of electrical components 1604, 1606, and 1608 can exist within memory 1610.

The various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of codes and/or instructions on a machine readable medium and/or computer readable medium, which may be incorporated into a computer program product.

In one or more aspects, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Furthermore, to the extent that the term "includes" is used in either the detailed description or the claims, such term is intended to be inclusive in a manner similar to the term "comprising" as "comprising" is interpreted when employed as a transitional word in a claim. Furthermore, although elements of the described aspects and/or aspects may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

What is claimed is:

1. A method for scheduling over multiple hops in wireless communication networks, comprising:
providing, by an apparatus, a set of radio resources for use by one or more nodes;
requesting, by the apparatus, a number of frames from a serving base station before using them at a relay station, wherein the request is included in an acknowledgment; and
assigning, by the apparatus, the radio resources for use in downlink and uplink communications in a paired manner, wherein assigning resources in a paired manner further includes assigning a corresponding uplink control sub-frame for each set of downlink sub-frames assigned to a hop simultaneous with the assignment of the downlink sub-frames, and assigning a corresponding downlink control sub-frame for each set of uplink sub-frames assigned to a hop simultaneous with the assignment of the uplink sub-frames.

2. The method of claim 1, further comprising employing a distributed scheduling scheme to assign the resources, wherein a base station determines the resources that a relay station can use for scheduling a set of access terminals associated with the relay station, and the relay station autonomously schedules the access terminals on the resources.

3. The method of claim 1, further comprising employing a centralized scheduling scheme to assign the resources, wherein a base station determines the scheduling of resources for a set of access terminals associated with a relay station.

4. The method of claim 1, further comprising statically assigning resources to each hop, wherein adjacent hops are assigned orthogonal resources.

5. The method of claim 4, further comprising reassigning the resources over time based on at least one of loading on each hop or throughput imbalance.

6. The method of claim 3, further comprising switching a static allocation of the radio resources by at least one of: using a set of sub-frames solely for control signaling, at least one of not sending or receiving a control signal, or delaying the sending of at least one control signal.

7. The method of claim 6, further comprising switching the static allocation based at least in part on at least one of a frequency of the static allocation changes, or if more flexible allocations are desired.

8. The method of claim 1, further comprising dynamically assigning resources to each hop based at least in part on at least one of traffic or channel conditions.

9. The method of claim 8, wherein the scheduling is dynamic at the relay station.

10. The method of claim 9, wherein the acknowledgement is sent by a relay station in response to a packet obtained from the base station for a downstream access terminal.

11. The method of claim 10, wherein the request includes at least one of a latency period or a number of frames needed.

12. The method of claim 11, wherein the relay station cannot use the resources until an acknowledgement of the request is obtained.

13. At least one processor configured to schedule over multiple hops in wireless communication networks, comprising:
a first module for providing a set of radio resources for use by one or more nodes;
a second module for receiving a request for a number of sub-frames from a relay station, wherein the request includes an acknowledgement; and
a third module for assigning the radio resources for use in downlink and uplink communications in a paired manner, wherein assigning resources in a paired manner further includes assigning a corresponding uplink control sub-frame for each set of downlink sub-frames assigned to a hop simultaneous with the assignment of the downlink sub-frames, and assigning a corresponding downlink control sub-frame for each set of uplink sub-frames assigned to a hop simultaneous with the assignment of the uplink sub-frames.

14. A computer program product, comprising:
a non-transitory computer-readable medium comprising:
a first set of codes for causing a computer to provide a set of radio resources for use by one or more nodes;
a second set of codes for causing the computer to receive a request for a number of sub-frames from a relay station, wherein the request includes an acknowledgement; and
a third set of codes for assigning the radio resources for use in downlink and uplink communications in a paired manner, wherein assigning resources in a paired manner further includes assigning a corresponding uplink control sub-frame for each set of downlink sub-frames assigned to a hop simultaneous with the assignment of the downlink sub-frames, and assigning a corresponding downlink control sub-frame for each set of uplink sub-frames assigned to a hop simultaneous with the assignment of the uplink sub-frames.

15. An apparatus, comprising:
means for providing a set of radio resources for use by one or more nodes;
means for receiving a request for a number of sub-frames from a relay station, wherein the request includes an acknowledgement; and
means for assigning the radio resources for use in downlink and uplink communications in a paired manner, wherein assigning resources in a paired manner further includes assigning a corresponding uplink control sub-frame for each set of downlink sub-frames assigned to a hop simultaneous with the assignment of the downlink sub-frames, and assigning a corresponding downlink control sub-frame for each set of uplink sub-frames assigned to a hop simultaneous with the assignment of the uplink sub-frames.

16. The apparatus of claim 15, further comprising means for distributing scheduling of the radio resources, wherein a base station determines the resources that a relay station can use for scheduling a set of access terminals associated with the relay station, and the relay station autonomously schedules the access terminals on the resources.

17. The apparatus of claim 15, further comprising means for centralizing scheduling of the radio resources, wherein a base station determines the scheduling of resources for a set of access terminals associated with a relay station.

18. The apparatus of claim 15, further comprising means for statically assigning the resources to each hop, wherein adjacent hops are assigned orthogonal resources.

19. The apparatus of claim 15, further comprising means for reassigning the resources over time based on at least one of loading on each hop or throughput imbalance.

20. The apparatus of claim 15, further comprising means for switching a static allocation of the radio resources by at least one of: using a set of sub-frames solely for control signaling, at least one of not sending or receiving a control signal, or delaying the sending of at least one control signal.

21. The apparatus of claim 20, further comprising means for switching the static allocation based at least in part on at least one of a frequency of the static allocation changes, or if more flexible allocations are desired.

22. The apparatus of claim 15, further comprising means for dynamically assigning frames to each hop based at least in part on at least one of traffic or channel conditions.

23. The apparatus of claim 22, wherein scheduling is dynamic at the relay station.

24. The apparatus of claim 23, wherein the acknowledgement is sent by the relay station in response to a packet obtained from a base station for a downstream access terminal.

25. The apparatus of claim 23, further comprising means for including at least one of a latency period or a number of sub-frames needed in the request.

26. The apparatus of claim 23, wherein the relay station cannot use the resources until an acknowledgement of the request is obtained.

27. An apparatus comprising,
a radio component that provides a set of radio resources for use by one or more nodes; and
a scheduling component that receives a request for a number of sub-frames from a relay station, wherein the request includes an acknowledgement and assigns the radio resources for use in downlink and uplink communications in a paired manner, wherein assigning resources in a paired manner includes assigning a corresponding uplink control sub-frame for each set of downlink sub-frames assigned to a hop simultaneous with the assignment of the downlink sub-frames, and assigning a corresponding downlink control sub-frame for each set of uplink sub-frames assigned to a hop simultaneous with the assignment of the uplink sub-frames.

28. The apparatus of claim 27, the scheduling component employs a distributed scheduling scheme for allocation of the radio resources, wherein a base station determines resources that a relay station can use for scheduling a set of access terminals associated with the relay station, and the relay station autonomously schedules the access terminals on the resources.

29. The apparatus of claim 27, the scheduling component employs a centralized scheduling scheme for allocation of the radio resources, wherein a base station determines scheduling of resources for a set of access terminals associated with a relay station.

30. The apparatus of claim 27, the scheduling component statically assigns the resources to each hop, wherein adjacent hops are assigned orthogonal resources.

31. The apparatus of claim 27, the scheduling component reassigns the resources over time based on at least one of loading on each hop or throughput imbalance.

32. The apparatus of claim 31, the scheduling component switches a static allocation of the radio resources by at least one of: using a plurality of frames solely for control signaling, at least one of not sending or receiving a control signal, or delaying the sending of at least one control signal.

33. The apparatus of claim 32, wherein the scheduling component switches the static allocation based at least in part on at least one of a frequency of the static allocation changes, or if more flexible allocations are desired.

34. The apparatus of claim 27, the scheduling component dynamically assigns resources to each hop based at least in part on at least one of traffic or channel conditions.

35. The apparatus of claim 34, the scheduling component wherein the scheduling is dynamic at the relay station.

36. The apparatus of claim 35, wherein the acknowledgement is sent by the relay station in response to a packet obtained for a downstream access terminal.

37. The apparatus of claim 35, wherein the request includes at least one of a latency period or a number of sub-frames.

38. The apparatus of claim 35, wherein the relay station cannot use the resources until an acknowledgement of the request is obtained.

39. The apparatus of claim 27, wherein the scheduling component employs at least one of: transparent scheduling, wherein an access terminal listens directly to a base station and a relay station does not transmit control information, or explicit scheduling, wherein the relay station does transmit control information.

40. The apparatus of claim 27, further comprising an artificial intelligence component that facilitates automating one or more aspects of the apparatus.

* * * * *